United States Patent Office 3,787,561
Patented Jan. 22, 1974

3,787,561
LOOSELY AGGREGATED 100 MILLIMICRON MICELLULAR SILICA
Ellsworth G. Acker, Baltimore, and Milton E. Winyall, Ellicott City, Md., assignors to W. R. Grace & Co., New York, N.Y.
No Drawing. Filed May 5, 1971, Ser. No. 140,569
Int. Cl. C01b 33/12, 33/18
U.S. Cl. 423—339                                         8 Claims

ABSTRACT OF THE DISCLOSURE

Ultrafine silica materials are produced by first forming a lossely aggregated approximately 100 millimicron micellular silica and fluid energy milling this silica to an ultrafine silica. The loosely aggregated 100 millimicron micellular silica is produced by acid neutralizing a concentrated silicate solution in a two step procedure followed by a hot aging at about 70 to 100° C. for ¼ to 5 hours to yield the silica product. This silica is washed and then may be dried or directly fed to a fluid energy mill for deaggregation and drying to form the ultrafine size silica.

This invention relates to a method of producing loosely aggregated about 100 millimicron average sized silica particles. Further, this invention relates to this loosely aggregated about 100 millimicron average sized silica particles.

For many uses, it is preferred that the silica be produced in an ultrafine sized condition. In order to accomplish this, many silica products are produced by flame techniques or other related processes. It has to this time not been generally known how to produce such ultrafine silicas by acid neutralization of a silicate followed by milling. However, the process of the present invention produces loosely aggregated 100 millimicron average size micelles of silica which on milling are formed into an ultrafine sized silica substance. These ultrafine sized silica products have a low density and are very useful as grease thickeners, fillers and reinforcing agents.

It is an object of this invention to produce loosely aggregated approximately 100 millimicron micellular silica which is capable of being deaggregated by milling to an ultrafine sized silica material.

It is further an object of this invention to produce this loosely aggregated approximately 100 millimicron micellular silica by the acid neutralization of a silicate solution.

It is also an object of this invention to set out an intricate combination of materials and procedures which are capable of producing ultrafine sized silica products.

In brief summary, this invention comprises forming a concentrated silicate solution. This solution is well agitated and an aqueous solution of ammonium acetate is added to give about 25 percent neutralization of the Na₂O in the silicate. The resulting white slurry is then completely neutralized with preferably more ammonium acetate or straight acetic acid. This silica slurry is hot aged at about 70–100° C. for from ¼ to 5 hours, filtered, and washed on the filter. This washed slurry may be dried, or fed to a fluid energy mill employing steam or hot air. The fluid energy mill deaggregates and dries the silica.

Broadly, this invention comprises the forming of loosely aggregated approximately 100 millimicron micellular silica capable of being ground to an ultrafine silica product. By approximately 100 millimicron micellular silica is meant a silica wherein the micelles are of an average 100 millimicron size, but do occur over a size range of about 80 to 200 millimicrons. This loosely aggregated about 100 millimicron micellular silica is produced by the acid neutralization of a concentrated silicate solution, preferably a sodium silicate solution. By concentrated silicate solution is meant a solution which contains from about 16 to 20 percent $SiO_2$. This silicate solution is well agitated and an aqueous solution of ammonium acetate which contains from about 5 to 10 percent by weight acetic acid is added so as to neutralize about 25 percent of the alkali ($Na_2O$) of the silicate solution. These reagents may be added separately as ammonia and acetic acid, or combined as ammonium acetate. At 25 percent neutralization, there results a white slurry. The $SiO_2$ concentration of the slurry should be about 12–14 percent by weight at this point. This slurry is then completely neutralized, preferably using an aqueous solution of ammonium acetate or acetic acid, or mixtures of these materials. However, other acids such as aqueous solutions of sulfuric acid, carboxylic acids such as formic acid or propionic acid or benzoic acid may also be used. The slurry is completely neutralized at a pH of about 10. This fully neutralized silica is then hot aged at 70–100° C. for from 15 minutes to 5 hours, and preferably at about 90–100° C. for about one hour. This slurry is then cooled, filtered and washed on the filter. The product at this stage is a loosely aggregated 100 millimicron micellular silica. Following the washing, the silica is dried by any of the conventional techniques such as oven drying, pan drying, spray drying or so on, or directly fed to a fluid energy mill to break up the loose aggregates of the 100 millimicron micellular primary spherical silica to ultrafine silica. The fluid energy mill is operated either using hot air at about 400° F. to 800° F. or steam at 400° F. to 800° F. The pressure in operating the fluid energy mill is 75 to 200 p.s.i. The aggregate silica fed to the fluid energy mill has an average particle size of about .5 micron.

The silica produced by this process was blended into an oil base. The oil base was very effectively thickened to a grease consistency.

The following examples are set out to further amplify the invention.

EXAMPLE 1

500 ml. of an aqueous silicate solution containing 28 percent $SiO_2$ and 8.7 percent $Na_2O$ is formed. To this solution is added 300 ml. of water and 100 ml. of a 30 percent $NH_3$ solution. 25 ml. of acetic acid in 400 ml. of water is then added to this mixture. During these additions, the silicate is well agitated. After the addition of the acetic acid, a white slurry forms. The pH is about 11.2. 100 g. of ammonium acetate in 800 ml. of water is then added and the pH decreases to about 10. This slurry is then heated at 80–90° C. for 1 hour, filtered and washed with a hot 0.5 percent ammonium carbonate solution on the filter. This washed silica is then oven dried at 200° C. The silica product has a surface area of 43 m.²/g. and a pore volume of 1.75 cc./g. Electron micrographs show loosely aggregated 100 millimicron sized primary spherical particles.

What is claimed is:
1. A method of producing loosely aggregated about 100 millimicron micellular silica comprising:
 (a) forming an aqueous sodium silicate solution containing from about 16 to 20 percent $SiO_2$;
 (b) admixing a first solution selected from the group consisting of ammonium acetate and ammonium acetate-acetic acid so as to neutralize about 25 percent of said silicate to form a slurry containing about 12–14 percent $SiO_2$;
 (c) admixing a second solution selected from the group consisting of ammonium acetate, acetic acid, formic acid, propionic acid, benzoic acid, sulfuric acid and mixtures thereof so as to completely neutralize said formed slurry;

(d) aging said neutralized slurry at a temperature of from about 70 to 100° C. for from ¼ to 5 hours; and (e) washing and drying said slurry and recovering a loosely aggregated 100 millimicron micellular silica.

2. A method as in claim 1 wherein said silicate solution has an $SiO_2$ content of about 20 percent by weight.

3. A method as in claim 1 wherein said aging is at 90 to 100° C. for about 1 hour.

4. A method as in claim 1 wherein after washing, said slurry is fed to a fluid energy mill whereby the loosely aggregated about 100 millimicron micellular silica is reduced to an ultrafine sized silica.

5. A method as in claim 4 wherein said fluid energy mill is operated using air at from about 400 to 800° C. and 75 to 200 p.s.i. is used as the grinding media.

6. A method as in claim 5 wherein an ammonium acetate-acetic acid mixture is used to neutralize 25 percent of said silica, and said slurry is aged at 90 to 100° C. for 1 hour.

7. A method as in claim 4 wherein said fluid energy mill is operated using steam at from about 400 to 800° F. and 75 to 200 p.s.i. is used as the grinding media.

8. A method as in claim 7 wherein an ammonium acetate-acetic acid mixture is used to neutralize 25 percent of said silica, and said slurry is aged at 90 to 100° C. for 1 hour.

References Cited

UNITED STATES PATENTS

| | | | |
|---|---|---|---|
| 1,819,356 | 8/1931 | Church | 423—335 |
| 2,358,201 | 9/1944 | Behrman | 423—338 |
| 2,588,853 | 3/1952 | Kumins et al. | 423—339 |
| 2,601,235 | 6/1952 | Alexander et al. | 423—339 |
| 2,940,830 | 6/1960 | Thornhill | 423—339 |
| 3,081,154 | 3/1963 | Acker et al. | 423—339 |
| 3,433,593 | 3/1969 | Reinhardt et al. | 423—339 |

FOREIGN PATENTS

| | | | |
|---|---|---|---|
| 137,113 | 1960 | U.S.S.R. | 23—182 R |

EDWARD STERN, Primary Examiner

U.S. Cl. X.R.

423—335